United States Patent
Tochio et al.

(10) Patent No.: US 10,848,840 B2
(45) Date of Patent: Nov. 24, 2020

(54) COMMUNICATION APPARATUS AND SIGNAL RELAY METHOD

(71) Applicant: FUJITSU LIMITED, Kawasaki (JP)

(72) Inventors: Yuji Tochio, Yokohama (JP); Toru Katagiri, Kawasaki (JP); Hiroshi Tomonaga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/572,069

(22) Filed: Sep. 16, 2019

(65) Prior Publication Data

US 2020/0014990 A1    Jan. 9, 2020

Related U.S. Application Data

(63) Continuation of application No. PCT/JP2018/001970, filed on Jan. 23, 2018.

(30) Foreign Application Priority Data

Mar. 21, 2017  (JP) ................. 2017-054912

(51) Int. Cl.
  *H04B 10/00*  (2013.01)
  *H04Q 11/00*  (2006.01)
  (Continued)

(52) U.S. Cl.
  CPC ..... *H04Q 11/0003* (2013.01); *H04L 12/4679* (2013.01); *H04Q 11/0067* (2013.01);
  (Continued)

(58) Field of Classification Search
  CPC .. H04B 10/29; H04J 14/0227; H04J 14/0254; H04J 14/0257; H04J 14/0261; H04J 14/0267; H04J 14/0272; H04J 14/0273
  See application file for complete search history.

(56) References Cited

U.S. PATENT DOCUMENTS

| | | |
|---|---|---|
| 6,003,086 A | 12/1999 | Mitsutake et al. |
| 2013/0114962 A1 | 5/2013 | Oka et al. |

(Continued)

FOREIGN PATENT DOCUMENTS

| | | |
|---|---|---|
| CN | 103004128 A | 3/2013 |
| CN | 105122763 A | 12/2015 |

(Continued)

OTHER PUBLICATIONS

International Search Report dated Apr. 10, 2018 in corresponding International Patent Application No. PCT/JP2018/001970.

(Continued)

*Primary Examiner* — Daniel G Dobson
(74) *Attorney, Agent, or Firm* — Staas & Halsey LLP

(57) ABSTRACT

A communication apparatus includes a receiver configured to receive a signal from a first line, a signal processing circuit configured to perform descrambling processing on the received signal, detect a control signal from the descrambled signal, generate a signal in which an idle signal in accordance with a difference amount between a communication capacity of a second line as a transmission destination and a communication capacity of the first line is inserted in a position where the control signal is detected, and perform scrambling processing on the generated signal, and a transmitter configured to output the scrambled signal to the second line.

8 Claims, 12 Drawing Sheets

(51) Int. Cl.
*H04L 12/46* (2006.01)
*H04J 14/00* (2006.01)

(52) U.S. Cl.
CPC .............. *H04Q 2011/0041* (2013.01); *H04Q 2011/0088* (2013.01)

(56) References Cited

U.S. PATENT DOCUMENTS

| | | | | |
|---|---|---|---|---|
| 2015/0016473 | A1* | 1/2015 | Wakabayashi | H04L 12/56 370/474 |
| 2017/0324496 | A1 | 11/2017 | Yamada et al. | |
| 2020/0014610 | A1 | 1/2020 | Cao | |

FOREIGN PATENT DOCUMENTS

| | | |
|---|---|---|
| JP | 9-319671 | 12/1997 |
| JP | 10-79716 | 3/1998 |
| JP | 2000-188578 | 7/2000 |
| JP | 2009-105723 | 5/2009 |
| JP | 2015-19290 | 1/2015 |
| WO | 2016/084893 | 6/2016 |

OTHER PUBLICATIONS

Written Opinion of the International Search Authority dated Apr. 10, 2018 in corresponding International Patent Application No. PCT/JP2018/001970.
Chinese Office Action dated Jul. 9, 2020, in corresponding Chinese Patent Application No. 201880019017.8.

* cited by examiner

FIG. 3

| FlexE PORT NUMBER | COMMUNICATION CAPACITY | VLAN IDENTIFIER |
|---|---|---|
| 1 | Xa | A |
|  | Xb | B |
|  | Xc | C |
| 2 | Xd | A |
|  | Xf | D |
|  | ⋮ | ⋮ |
| ⋮ | ⋮ | ⋮ |

COMMUNICATION APPARATUS AND SIGNAL RELAY METHOD

CROSS-REFERENCE TO RELATED APPLICATION

This application is a continuation application of International Application PCT/JP2018/001970 filed on Jan. 23, 2018 and designated the U.S., the entire contents of which are incorporated herein by reference. The International Application PCT/JP2018/001970 is based upon and claims the benefit of priority of the prior Japanese Patent Application No. 2017-054912, filed on Mar. 21, 2017, the entire contents of which are incorporated herein by reference.

FIELD

The embodiments discussed herein are related to a communication apparatus and a signal relay method.

BACKGROUND

As a transmission technique to support a large capacity and long distance transmission, the Flex Ethernet (FlexE) technique in which traffic is multiplexed in a unit of 10 G, 25 G, or 40 G to achieve data transmission of 100 G has become available driven by the spread of data centers in recent years. The FlexE technique is disclosed at the following URL. http://www.oiforum.com/wp-content/uploads/OIF-FLEXE-01.0.pdf FIG. 9 is an explanatory diagram illustrating an example of a communication system 100. The communication system 100 illustrated in FIG. 9 includes a first termination device 101, a first relay device 102, a second relay device 103, and a second termination device 104. The first termination device 101 is connected to three 100 giga-bit Ethernet (100 GBE) lines 105 provided between the first termination device 101 and the first relay device 102, for example. The first relay device 102 is, for example, an optical transport network (OTN) device connected to the three 100 GBE lines 105, and also connected to three optical data unit (ODU) 4 lines 106 provided between the first relay device 102 and the second relay device 103. The second relay device 103 is, for example, an OTN device connected to the three ODU4 lines 106, and also connected to three 100 GBE lines 107 provided between the second relay device 103 and the second termination device 104.

The first termination device 101 includes a first Shim processing unit 101A configured to perform FlexE signal processing between a plurality of FlexE clients and the three 100 GBE lines 105. The first relay device 102 includes, for example, a conversion unit 102A configured to map a 100 GBE signal from the 100 GBE line 105 to an ODU4 signal and de-map the ODU4 signal from the ODU4 line 106 to the 100 GBE signal. The second relay device 103 includes, for example, a conversion unit 103A configured to de-map the ODU4 signal from the ODU4 line 106 to the 100 GBE signal and map the 100 GBE signal from the 100 GBE line 107 to the ODU4 signal. The second termination device 104 includes a second Shim processing unit 104A configured to perform FlexE signal processing between a plurality of FlexE clients and the three 100 GBE lines 107.

The first termination device 101 is connected to the three 100 GBE lines 105 and the second termination device 104 is also similarly connected to the three 100 GBE lines 107, so that the first termination device 101 and the second termination device 104 are configured to be connected with three 100 GBE lines therebetween, and the circuit configurations thereof are the same. The first termination device 101 outputs three 100 GBE signals toward the first relay device 102. The first relay device 102 converts the three 100 GBE signals to three ODU4 signals, and outputs the three ODU4 signals toward the second relay device 103. Further, the second relay device 103 converts the three ODU4 signals to three 100 GBE signals, and outputs the three 100 GBE signals toward the second termination device 104. As a result, the first termination device 101 is able to transmit a large capacity FlexE signal between the first termination device 101 and the second termination device 104 through the first relay device 102 and the second relay device 103.

For example, as a related art literature, Japanese Laid-open Patent Publication No. 9-319671 is disclosed.

However, in FIG. 9, in a case where the first termination device 101 side is connected to three 100 GBE lines and the second termination device 104 side is connected to a single 400 GBE line, for example, the line configurations differ between the first termination device 101 and the second termination device 104. Accordingly, since the second relay device 103 does not have a function of signal conversion between three 100 GBE signals and a single 400 GBE signal, a FlexE signal is unable to be relayed between the first termination device 101 and the second termination device 104. For example, since the first termination device 101 and the second termination device 104 are unable to recognize the communication capacities of their opposing sides, the FlexE signal is unable to be relayed between the first termination device 101 and the second termination device 104.

SUMMARY

According to an aspect of the embodiments, a communication apparatus includes a receiver configured to receive a signal from a first line, a signal processing circuit configured to perform descrambling processing on the received signal, detect a control signal from the descrambled signal, generate a signal in which an idle signal in accordance with a difference amount between a communication capacity of a second line as a transmission destination and a communication capacity of the first line is inserted in a position where the control signal is detected, and perform scrambling processing on the generated signal, and a transmitter configured to output the scrambled signal to the second line.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory diagram illustrating an example of a table configuration of a band table;

DESCRIPTION OF EMBODIMENTS

In consideration of the above issue, an object of the embodiments is to provide a communication apparatus and the like able to secure a signal relay between a first termination device and a second termination device even when the line configurations are different between the first termination device and the second termination device.

Hereinafter, embodiments of a communication apparatus and a signal relay method disclosed in the present application will be described in detail with reference to the drawings. Note that disclosed techniques are not intended to be limited to the embodiments. Furthermore, the following embodiments may be appropriately combined within a range in which no contradiction occurs.

First Embodiment

Figure 1:
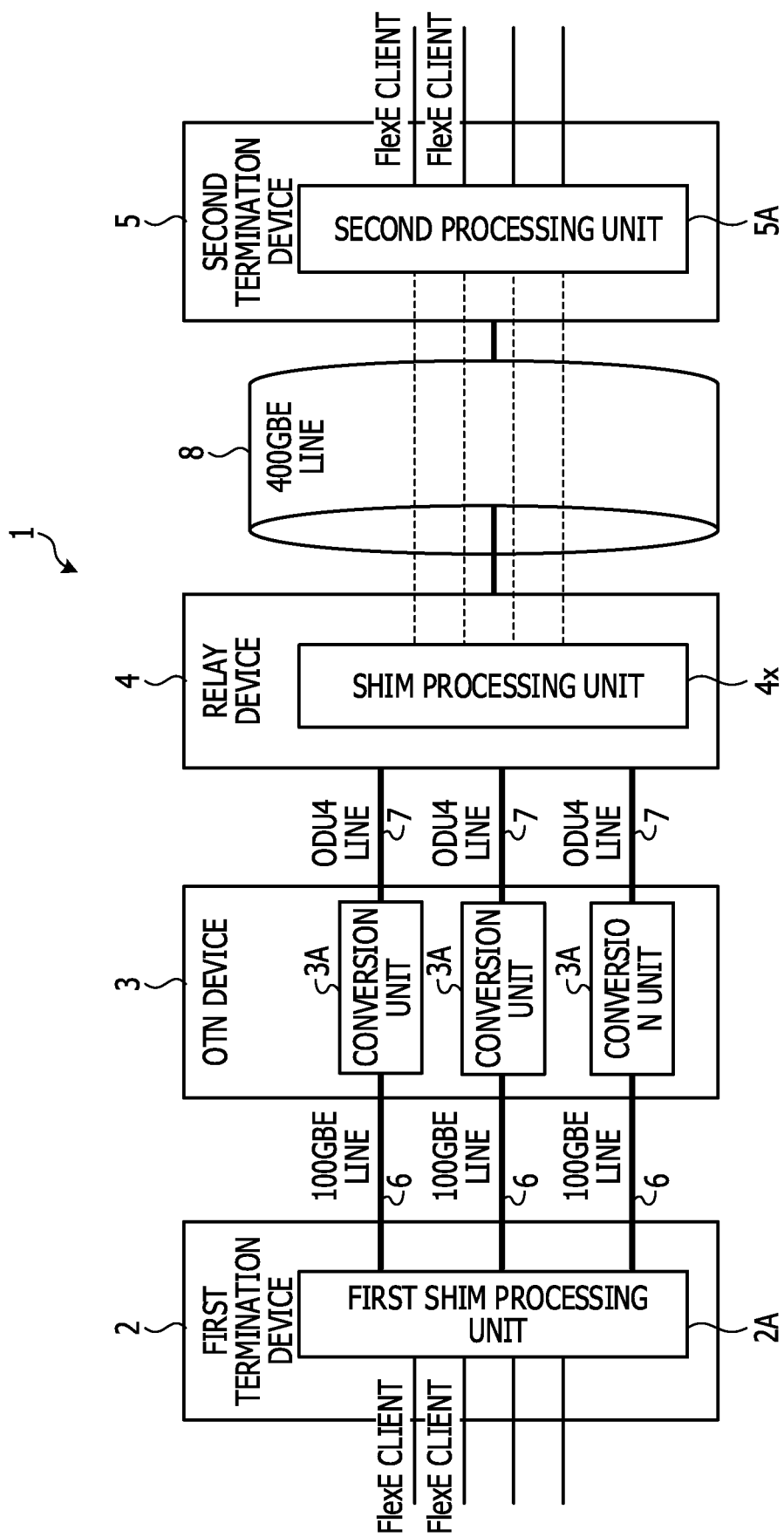
FIG. 1 is an explanatory diagram illustrating an example of a communication system of a first embodiment.

FIG. 1 is an explanatory diagram illustrating an example of a communication system 1 of a first embodiment. The communication system 1 illustrated in FIG. 1 includes a first termination device 2, an optical transport network (OTN) device 3, a relay device 4, and a second termination device 5. The first termination device 2 and the OTN device 3 are connected to each other with three 100 GBE lines 6 of Flex Ethernet (FlexE). The OTN device 3 and the relay device 4 are connected to each other with three ODU4 lines 7. The relay device 4 and the second termination device 5 are connected to each other with a single 400 GBE line 8 of FlexE. Since the first termination device 2 is connected to the three 100 GBE lines 6 and the second termination device 5 is connected to the single 400 GBE line 8, FlexE line configurations are different between the first termination device 2 and the second termination device 5. The FlexE line takes an unaware system in which clients are transmitted as one FlexE group, for example.

Figure 9:
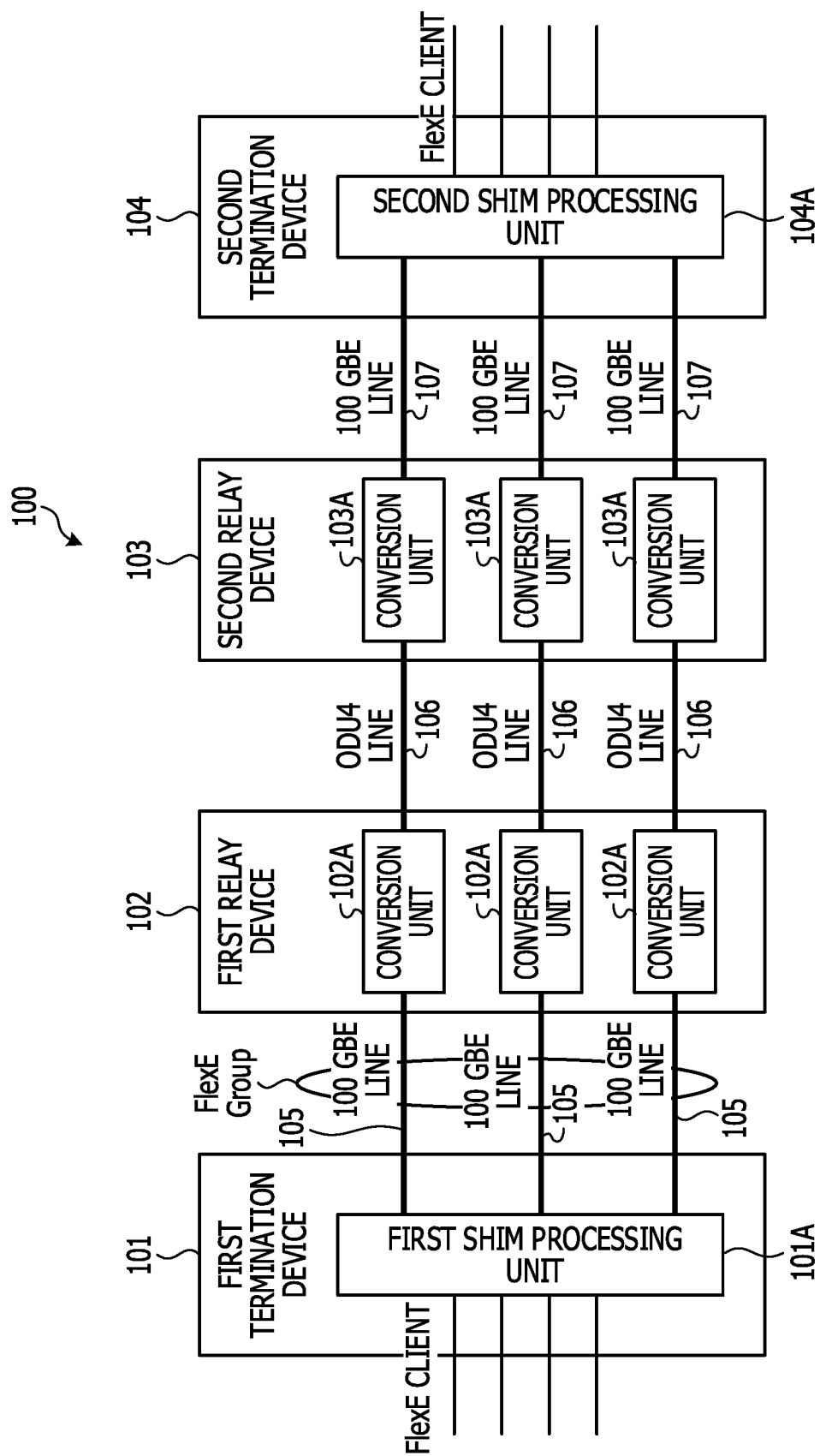
FIG. 9 is an explanatory diagram illustrating an example of a communication system.

The first termination device 2 includes a first Shim processing unit 2A. The first Shim processing unit 2A is a signal processing unit configured to manage signal processing between a plurality of FlexE clients and the three 100 GBE lines 6. The OTN device 3 includes a conversion unit 3A for each 100 GBE line 6. The conversion unit 3A maps a 100 GBE signal from the 100 GBE line 6 to an ODU4 signal and de-maps the ODU4 signal from the ODU4 line 7 to the 100 GBE signal, for example. The second termination device 5 includes a second processing unit 5A. The relay device 4 converts 300 GBE signals obtained from three ODU4 signals sent from the ODU4 lines 7 to one 400 GBE signal, for example. In addition, the relay device 4 converts one 400 GBE signal from the 400 GBE line 8 to three ODU4 signals equivalent to a 300 GBE signal. In terms of the FlexE configuration, a Shim processing unit 4X in the relay device 4 takes over the function of the second Shim processing unit illustrated in FIG. 9.

Figure 2A:
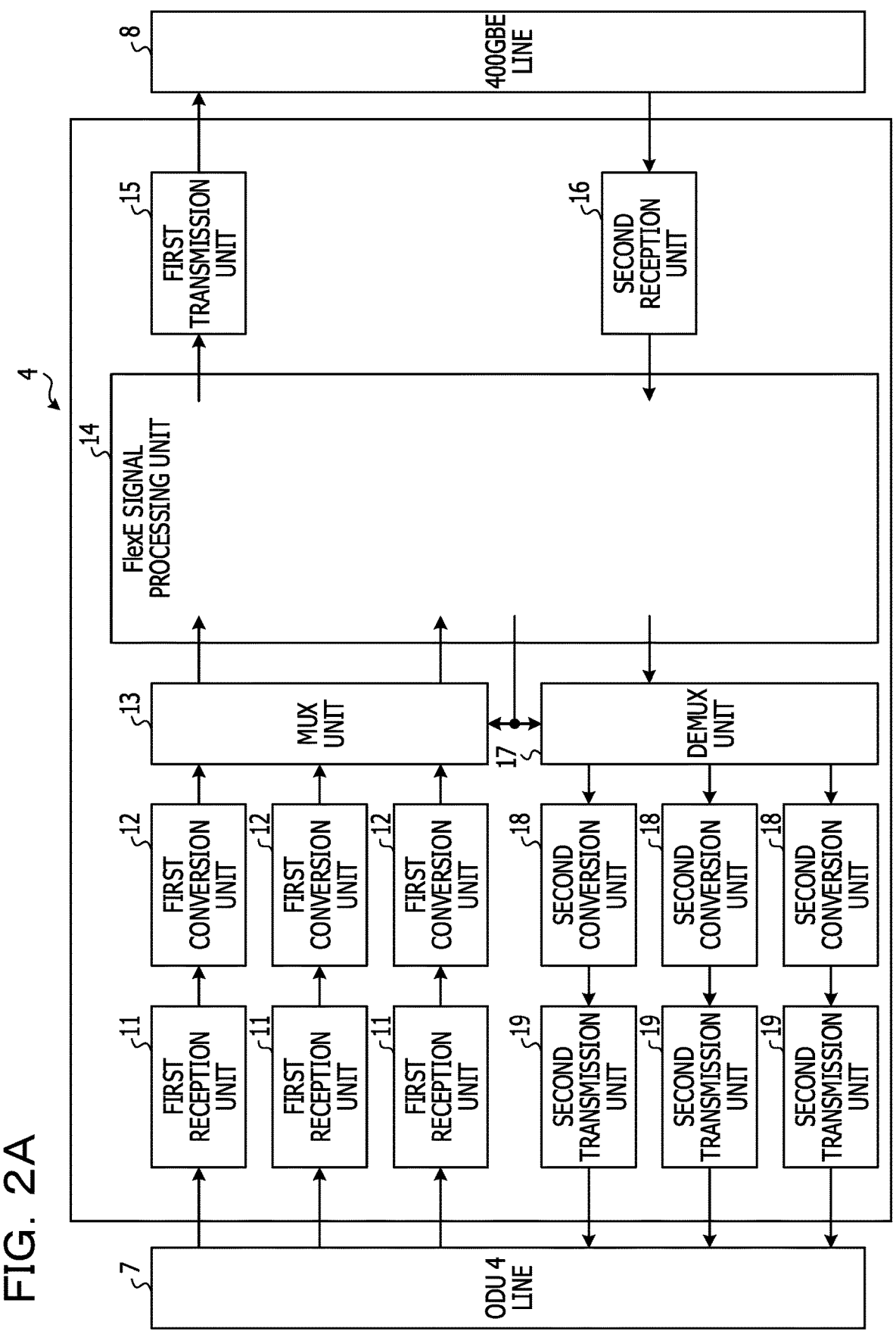
FIGS. 2A and 2B are explanatory diagrams illustrating an example of a functional configuration of a relay device.
Figure 2B:
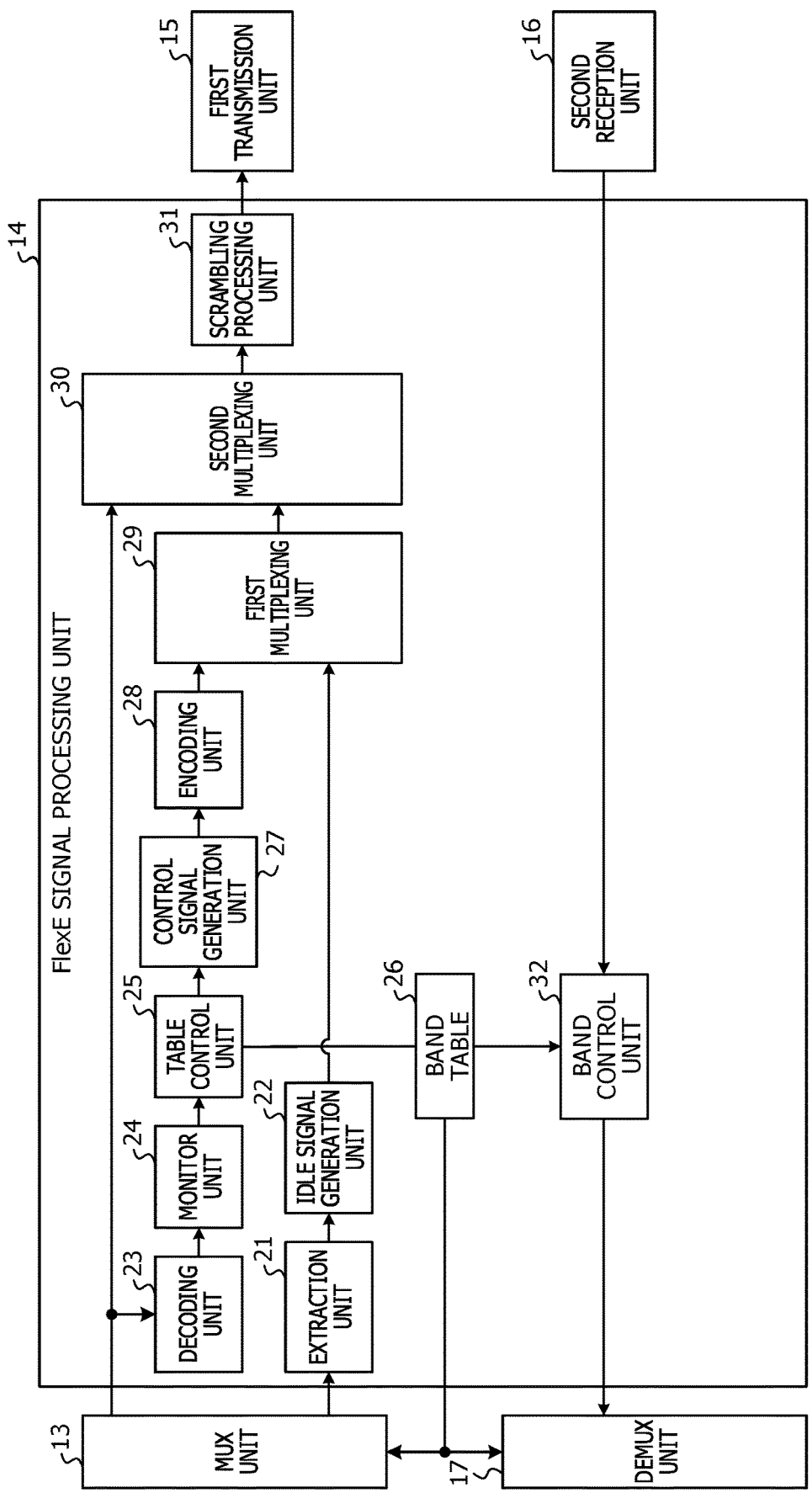

FIG. 2 is an explanatory diagram illustrating an example of a functional configuration of the relay device 4. The relay device 4 illustrated in FIG. 2 includes a first reception unit 11, a first conversion unit 12, a MUX unit 13, a FlexE signal processing section 14, a first transmission unit 15, a second reception unit 16, a DEMUX unit 17, a second conversion unit 18, and a second transmission unit 19. The Shim processing unit 4X includes, for example, the MUX unit 13, the DEMUX unit 17, and an extraction unit 21.

The first reception unit 11 receives an ODU4 signal from the ODU4 line 7. The first conversion unit 12 de-maps the ODU4 signal to a 100 GBE signal. The MUX unit 13 multiplexes three 100 GBE signals from the first conversion units 12 and outputs a 300 GBE signal. The FlexE signal processing section 14 converts the 300 GBE signal from the MUX unit 13 to a 400 GBE signal. The first transmission unit 15 outputs the 400 GBE signal from the FlexE signal processing section 14, to the 400 GBE line 8 on the second termination device 5 side.

The second reception unit 16 receives a single 400 GBE signal from the 400 GBE line 8. The FlexE signal processing section 14 converts the 400 GB signal, which will be explained later, to a 300 GBE signal. The DEMUX unit 17 demultiplexes the 300 GBE signal into three 100 GBE signals, and outputs the three 100 GBE signals. The DEMUX unit 17 outputs the three 100 GBE signals to the second conversion units 18. Each of the second conversion units 18 maps the 100 GBE signal to the ODU4 signal. Each of the second transmission units 19 outputs the ODU4 signal having been mapped by the second conversion unit 18, to the ODU4 line 7.

The FlexE signal processing section 14 includes the extraction unit 21, an idle signal generation unit 22, a decoding unit 23, a monitor unit 24, a table control unit 25, and a band table 26. The FlexE signal processing section 14 includes a control signal generation unit 27, an encoding unit 28, a first multiplexing unit 29, a second multiplexing unit 30, a scrambling processing unit 31, and a band control unit 32.

The extraction unit 21 collects a communication capacity for each physical port number from FlexE Shim information of the 300 GBE signal sent from the MUX unit 13. The FlexE Shim information is stored in the FlexE signal. The physical port number refers to a port number for identifying a physical port to be connected to each 100 GBE line 6. The communication capacity is an allowable amount of communication band of the FlexE signal passing through the physical port. The idle signal generation unit 22 calculates a difference amount between the communication capacity of the first termination device 2 side (300 GBE) and the communication capacity of the second termination device 5 side (400 GBE). Further, the idle signal generation unit 22 generates, for example, an idle signal equivalent to 100 GBE, which is the difference amount. The idle signal is a vacant 66 B FlexE signal after the 64 B/66 B encoding. This idle signal is multiplexed by the multiplexing unit 30 to be explained later.

The decoding unit 23 decodes a 66 B 100 GBE signal sent from the MUX unit 13 after the 64 B/66 B encoding, into a 64 B 100 GBE signal. The monitor unit 24 identifies a virtual local area network (VLAN) identifier from a MAC frame in the 64 B 100 GBE signal. The VLAN identifier is an identifier for identifying a FlexE client of the first termination device 2, for example. The monitor unit 24 counts signals for each VLAN identifier. The counting may be carried out all the time, or may take a result obtained by randomly extracting one calendar slot; for example, the counting method may be appropriately changed. The VLAN identification may not be required when there is only one FlexE client.

The table control unit 25 registers, in the band table 26, a communication capacity of each VLAN identifier of the FlexE signal for each physical port number. FIG. 3 is an explanatory diagram illustrating an example of a table configuration of the band table 26. The band table 26 illustrated in FIG. 3 manages a port number 26A, a communication capacity 26B, and a VLAN identifier 26C while associating them with each other. The port number 26A is a number for identifying a physical port through which the FlexE signal passes. The communication capacity 26B is a communication capacity for each VLAN identifier in the physical port. The VLAN identifier 26C is an identifier for identifying the VLAN. The FlexE signal processing section 14 references the band table 26 so as to recognize a communication capacity of each VLAN identifier for each physical port to be connected to the FlexE line.

The control signal generation unit 27 generates a control signal such as operations, administration, maintenance (OAM) based on the table contents of the band table 26. The control signal is, for example, a BW report function or a Pause function of the ITU-T G.8013/Y.1731 of OAM. The control signal is, for example, information to report a communication capacity of the first termination device 2 side, which is a transmission source, to the second termination device 5. The control signal is a control signal of 64 B. The encoding unit 28 encodes the control signal of 64 B into a control signal of 66 B.

Figure 4:
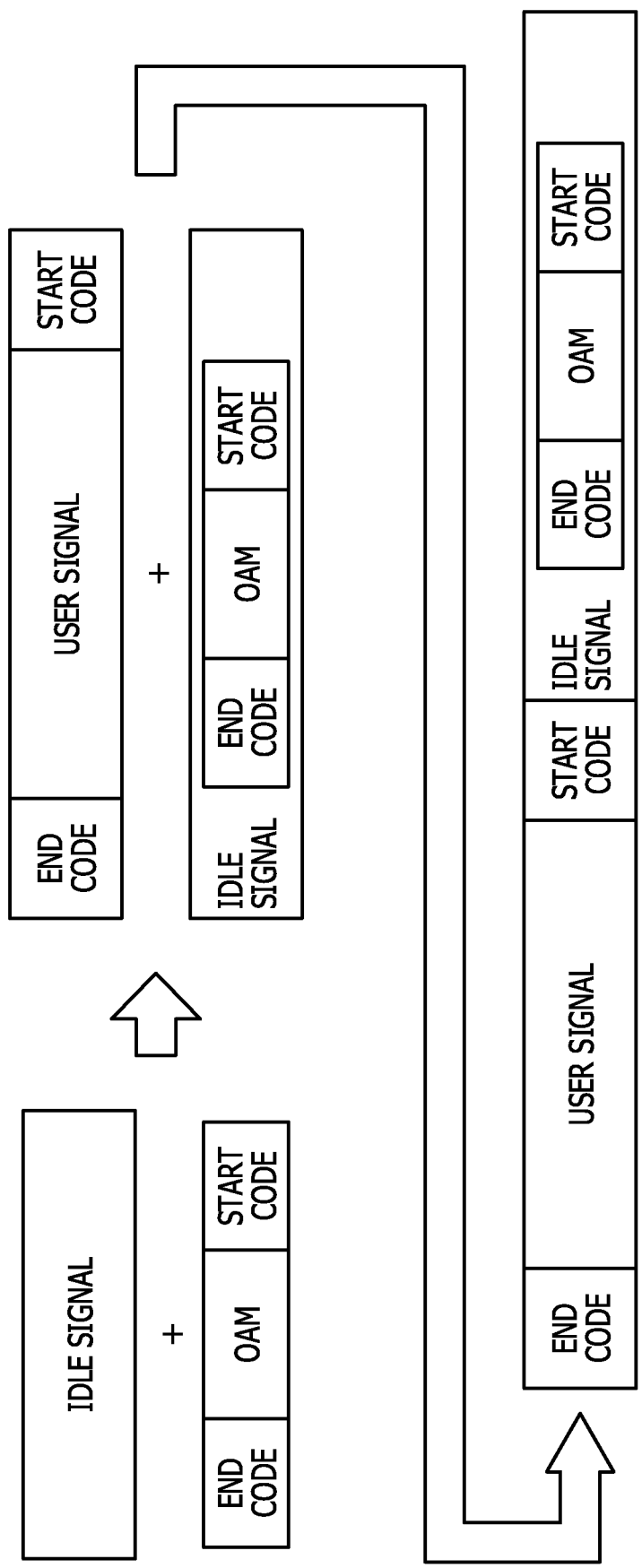
FIG. 4 is an explanatory diagram illustrating an example of a signal multiplex configuration of a relay device.

FIG. 4 is an explanatory diagram illustrating an example of a signal multiplex configuration of the relay device 4. The first multiplexing unit 29 is inputted with the encoded 66 B control signal from the encoding unit 28, and is also inputted with the vacant 66 B idle signal equivalent to 100 GBE from the idle signal generation unit 22. In the 66 B control signal illustrated in FIG. 4, OAM, a start code at the head of the OAM, and an end code at the tail end of the OAM are arranged. The first multiplexing unit 29 replaces part of the idle signal equivalent to 100 GBE with the control signal having the same size. The second multiplexing unit 30 is inputted with a 66 B user signal of the 300 GBE signal from the MUX unit 13, and is also inputted with the 66 B idle signal after storing the control signal therein from the first multiplexing unit 29. In the 66 B user signal illustrated in FIG. 4, the user signal, a start code at the head of the user signal, and an end code at the tail end of the user signal are arranged. Then, the second multiplexing unit 30 inserts the 66 B idle signal and control signal generated in the first multiplexing unit 29 between the 66 B user signals. Consequently, the second multiplexing unit 30 adds the 66 B user signal of 300 GBE and the 66 B idle signal equivalent to 100 GBE, and outputs a 66 B 400 GBE signal to the scrambling processing unit 31. In this function, a scheme in which buffering is performed on each user signal (frame) in order to reliably insert an idle signal between the user signals (in order not to lose data in the midway of the frame) is provided. The scrambling processing unit 31 performs scrambling processing on the 400 GBE signal from the second multiplexing unit 30, and outputs the scrambled 400 GBE signal to the first transmission unit 15. The first transmission unit 15 outputs one 400 GBE signal to the 400 GBE line 8.

When the second processing unit 5A within the second termination device 5 receives a 400 GBE signal from the relay device 4, the second processing unit 5A extracts a control signal from an idle signal equivalent to 100 GBE in the 400 GBE signal. The second processing unit 5A recognizes a communication capacity for three 100 GBE lines of the first termination device 2 as the transmission source, for example, recognizes the communication capacity of 300 GBE, based on the control signal. Consequently, in the case where the second termination device 5 transmits a FlexE signal toward the first termination device 2, the second termination device 5 generates a 400 GBE signal by adding an idle signal equivalent to 100 GBE to a 300 GBE signal, and outputs the 400 GBE signal to the 400 GBE line 8.

Then, the second reception unit 16 within the relay device 4 receives a 400 GBE signal from the single 400 GBE line 8. The band control unit 32 deletes an idle signal equivalent to 100 GBE from the 400 GBE signal, based on the communication capacity (300 GBE) of the first termination device 2 as the transmission source. The band control unit 32 outputs, to the DEMUX unit 17, a 300 GBE signal from which the idle signal has been deleted. The DEMUX unit 17 demultiplexes the 300 GBE signal into three 100 GBE signals based on the FlexE Shim information, and outputs the three 100 GBE signals. The DEMUX unit 17 outputs the 100 GBE signals to the second conversion units 18. Each of the second conversion units 18 maps the 100 GBE signal from the DEMUX unit 17 to an ODU4 signal. Each of the second transmission units 19 outputs the ODU4 signal to the ODU4 line. As a result, the relay device 4 outputs three ODU4 signals toward the OTN device 3. The OTN device 3 receives the three ODU4 signals, converts the three ODU4 signals to three 100 GBE signals, and outputs the three 100 GBE signals toward the first termination device 2. The first termination device 2 receives the three 100 GBE signals and outputs the three 100 GBE signals to the FlexE clients.

When the relay device 4 of the first embodiment receives a 300 GBE signal from the three ODU4 lines 7 corresponding to the three 100 GBE lines, the relay device 4 extracts the communication capacity (300 GBE) of the transmission source from the FlexE Shim information in the above 300 GBE signal. The relay device 4 generates an idle signal equivalent to 100 GBE in accordance with a difference amount between the communication capacity of the 400 GBE line 8 and the communication capacity (300 GBE) of the three ODU4 lines 7. Further, the relay device 4 generates one 400 GBE signal in which the idle signal equivalent to 100 GBE is added to the user signal equivalent to 300 GBE in the 300 GBE signal. Furthermore, the relay device 4 outputs the above one 400 GBE signal to the 400 GBE line 8. Consequently, the relay device 4 makes it possible to establish the FlexE signal relay between the first termination device 2 and the second termination device 5 even when the line configurations are different between the three 100 GBE lines 6 and the single 400 GBE line 8.

The relay device 4 inserts a communication capacity of three 100 GBE lines in the idle signal equivalent to 100 GBE, and reports, to the second termination device 5, the 400 GBE signal in which the idle signal equivalent to 100 GBE is added to the user signal. As a result, the relay device 4 is able to report, to the second termination device 5, the communication capacity (300 GBE) of the first termination device 2 side, which is the communication capacity of the transmission source.

When the relay device 4 receives a 400 GBE signal from the 400 GBE line 8, the relay device 4 deletes an idle signal equivalent to 100 GBE from the 400 GBE signal based on the communication capacity of the three 100 GBE lines of the first termination device 2 side, and outputs a 300 GBE signal to the DEMUX unit 17. As a result, the relay device 4 is able to relay and output the 400 GBE signal from the 400 GBE line 8 to the three 100 GBE lines 6.

The relay device 4 extracts a communication capacity for each VLAN identifier from the 300 GBE signal. Consequently, the relay device 4 is able to output a FlexE signal in accordance with the VLAN configuration to the 400 GBE line 8, based on the communication capacity for each of the VLAN identifiers. In addition, the relay device 4 inserts, in the idle signal, the communication capacity for each VLAN identifier as the communication capacity of three 100 GBE lines 6. As a result, the relay device 4 is able to report, to the second termination device 5, the communication capacity for each VLAN identifier of the three 100 GBE lines 6.

The relay device 4 outputs, without decoding a 66 B 300 GBE signal as a main signal from the MUX unit 13 into a 64 B signal, the 66 B 300 GBE signal to the second multiplexing unit 30. As a result, since the relay device 4 is not required to decode the main signal into a 64 B signal once and then encode the 64 B signal into the 66 B signal again, it is possible to carry out signal processing by extending the IEEE802.3 Sequence ordered set.

In the relay device 4 of the first embodiment, an idle signal equivalent to the difference amount is added based on the start code and end code of the user signal; however, the relay device 4 may determine an inter frame gap (IFG) based on a control bit in a bit string of the user signal and may insert an idle signal, and thus an embodiment of such a configuration and operation will be described below as a second embodiment.

Second Embodiment

Figure 5A:
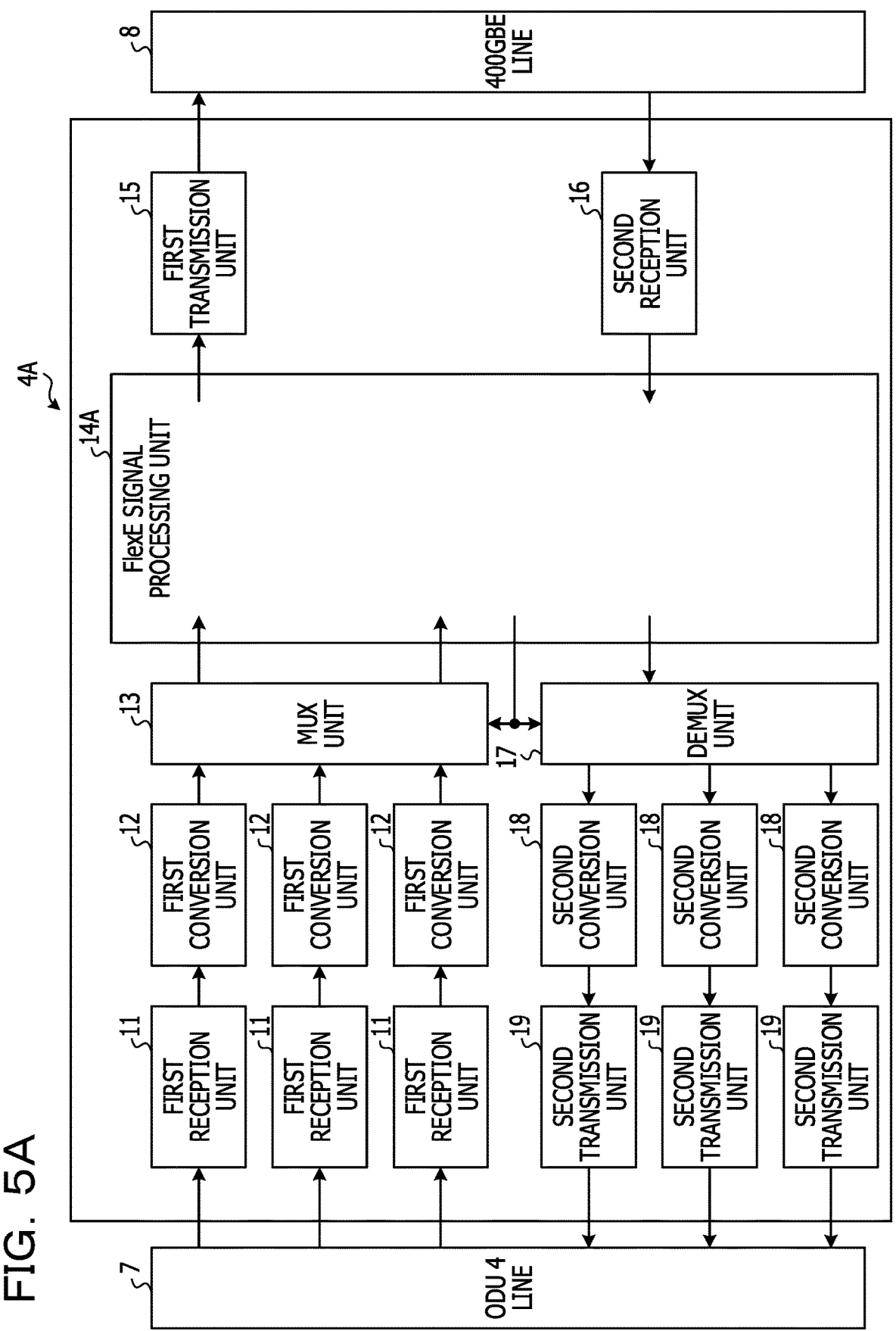
FIGS. 5A and 5B are explanatory diagrams illustrating an example of a functional configuration of a relay device of a second embodiment.
Figure 5B:
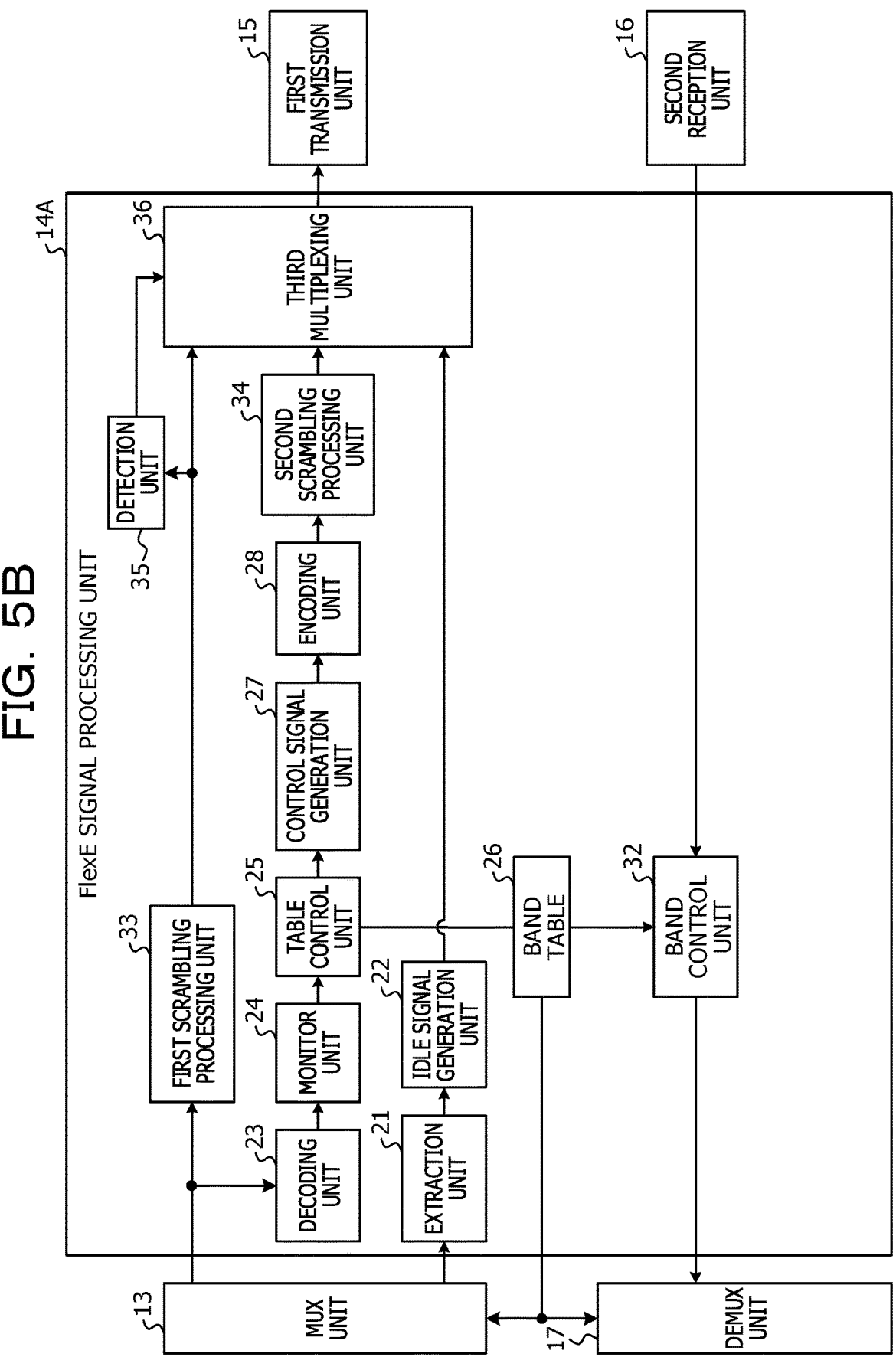

FIG. 5 is an explanatory diagram illustrating an example of a functional configuration of a relay device 4A of the second embodiment. Note that the same constituent elements as those of the relay device 4 illustrated in FIG. 2 are given the same reference numerals, and redundant descriptions of the constituent elements and operations thereof will be omitted.

A FlexE signal processing section 14A illustrated in FIG. 5 includes an extraction unit 21, an idle signal generation unit 22, a decoding unit 23, a monitor unit 24, a table control unit 25, a band table 26, a control signal generation unit 27, an encoding unit 28, and a band control unit 32. The FlexE signal processing section 14A includes a first scrambling processing unit 33, a second scrambling processing unit 34, a detection unit 35, and a third multiplexing unit 36.

Figure 6:
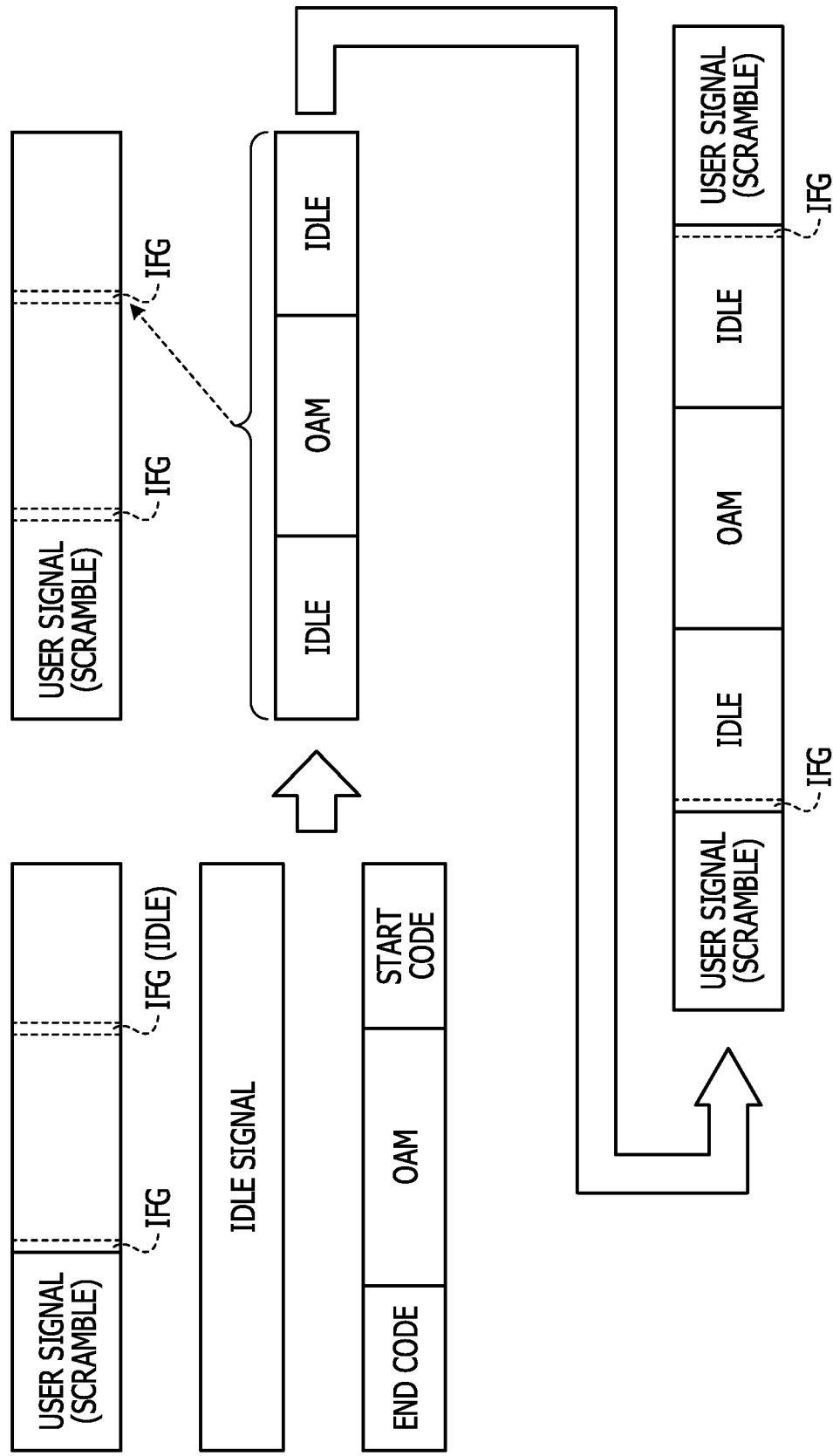
FIG. 6 is an explanatory diagram illustrating an example of a signal multiplex configuration of a relay device of the second embodiment.

The second scrambling processing unit 34 performs scrambling processing on a 66 B control signal from the encoding unit 28, and inputs the scrambled control signal to the third multiplexing unit 36. The idle signal generation unit 22 inputs an idle signal of 100 GBE equivalent to the difference amount, to the third multiplexing unit 36. The detection unit 35 detects an IFG from a 300 GBE signal. Since the 300 GBE signal is a scrambled 300 GBE signal of 66 B, the detection unit 35 is able to recognize, among the bits in the 66 B string, "01" or "10" at the head of the string, but unable to recognize other bits than the above-mentioned ones. Accordingly, the detection unit 35 is unable to recognize the start code and the end code of a frame. Then, the detection unit 35 detects a situation in which a control signal continues over a set interval, and determines that there exists an IFG between MAC frames when such situation is detected. FIG. 6 is an explanatory diagram illustrating an example of a signal multiplex configuration of the relay device 4A of the second embodiment. The third multiplexing unit 36 stores a control signal in an idle signal. The control signal illustrated in FIG. 6 includes OAM, a start code at the head of the OAM, and an end code at the tail end of the OAM. Further, the third multiplexing unit 36 inserts an idle signal equivalent to 100 GBE after storing the control signal therein, in an IFG of the 300 GBE signal, for example, in a position where there exists an idle signal present in the 300 GBE signal. With this, since the third multiplexing unit 36 is able to insert the idle signal equivalent to 100 GBE and the control signal in the 300 GBE signal, the third multiplexing unit 36 is able to output the above produced signal as a 400 GBE signal to the 400 GBE line 8. When this kind of signal is processed at the reception side, for example, when it is processed in the second termination device 5 illustrated in FIG. 1, the second termination device 5 is able to reconstruct the user signal and the control signal by dropping the continued idle signals.

The relay device 4A of the second embodiment detects an IFG in a 300 GBE signal, and inserts an idle signal in which the communication capacity of the three 100 GBE lines 6 is inserted in a position of the detected IFG so as to generate a 400 GBE signal. As a result, it is easy for the relay device 4A to insert the idle signal.

The relay device 4A does not perform descrambling processing on the scrambled 300 GBE signal, and detects an IFG only by an additional signal of control bits held in the 66 B signal from the bit string of the 300 GBE signal. As a result, the relay device 4A is able to detect the IFG from the bit string with ease.

The relay device 4A of the embodiment directly detects, from the signal, the communication capacity of the 100 GBE lines 6 of the transmission source and the communication capacity of the 400 GBE line 8 of the transmission destination; however, the communication capacity of the transmission source line and the communication capacity of the transmission destination line may be stored in advance.

In the relay device 4 of the first embodiment, when a 400 GBE signal from the second termination device 5 is received, an idle signal equivalent to 100 GBE is deleted from the 400 GBE signal; however, the embodiment is not limited thereto, and may be appropriately modified. Note that the same constituent elements as those of the relay device 4 of the first embodiment are given the same reference numerals, and redundant descriptions of the constituent elements and operations thereof will be omitted.

Third Embodiment

Figure 7A:
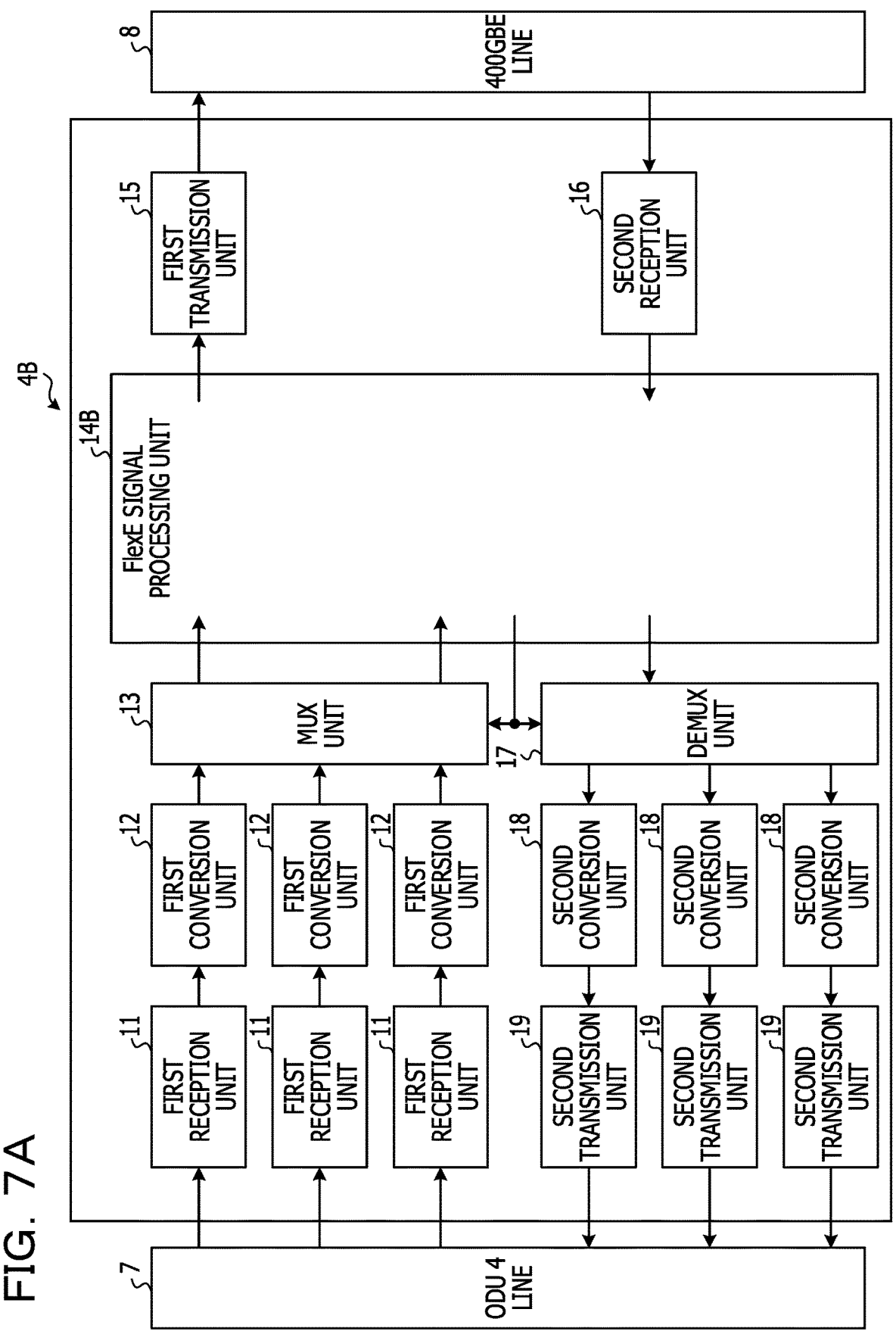
FIGS. 7A and 7B are an explanatory diagram illustrating an example of a functional configuration of a relay device of a third embodiment.
Figure 7B:
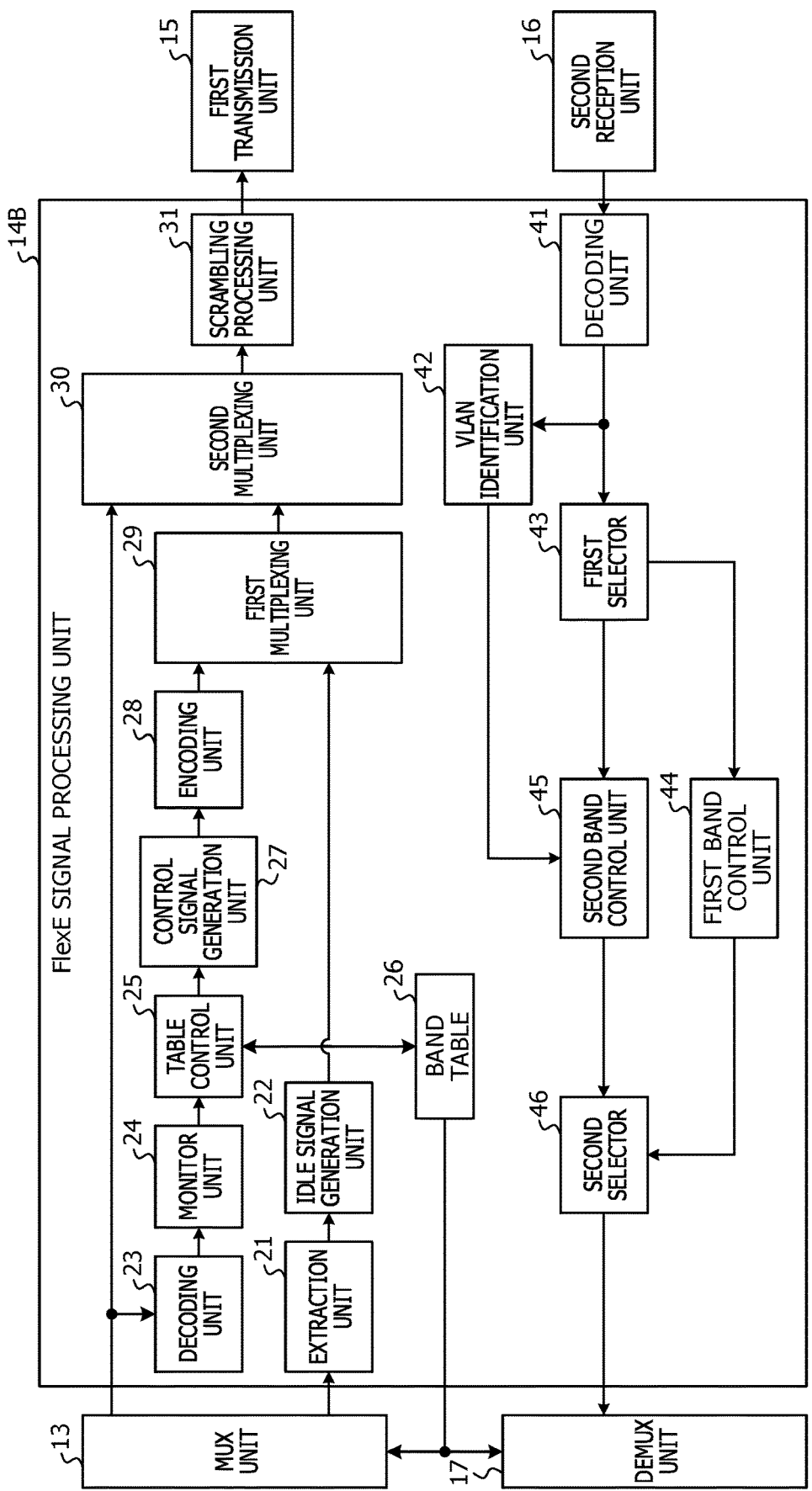

FIG. 7 is an explanatory diagram illustrating an example of a functional configuration of a relay device 4B of a third embodiment. A FlexE signal processing section 14B illustrated in FIG. 7 includes an extraction unit 21, an idle signal generation unit 22, a decoding unit 23, a monitor unit 24, a table control unit 25, a band table 26, a control signal generation unit 27, and an encoding unit 28. The FlexE signal processing section 14B includes a first multiplexing unit 29, a second multiplexing unit 30, and a scrambling processing unit 31. The FlexE signal processing section 14B further includes a decoding unit 41, a VLAN identification unit 42, a first selector 43, a first band control unit 44, a second band control unit 45, and a second selector 46.

The decoding unit 41 decodes a 66 B 400 GBE signal from a second reception unit 16 into a 64 B 400 GBE signal. The VLAN identification unit 42 identifies a VLAN identifier from a MAC frame of the 64 B 400 GBE signal. The first selector 43 inputs, in response to a selector signal, a 64 B FlexE signal (400 GBE signal) to the first band control unit 44 or the second band control unit 45. The selector signal is a signal for selecting input for the first band control unit 44 or second band control unit 45 in accordance with the setting.

The first band control unit 44 removes an idle signal equivalent to 100 GBE from the 400 GBE signal. The first band control unit 44 inputs a 300 GBE signal, from which the idle signal has been removed, to the second selector 46.

The second band control unit 45 extracts a FlexE signal for each VLAN identifier from the 400 GBE signal based on an identification result by the VLAN identification unit 42. The second band control unit 45 inputs the FlexE signal for each VLAN identifier to the second selector 46. The FlexE signal for each VLAN identifier is a 300 GBE signal. The second selector 46 outputs, in response to a selector signal, the 300 GBE signal from the first band control unit 44 or second band control unit 45 to a DEMUX unit 17. The selector signal is a signal for selecting output of the first band control unit 44 or second band control unit 45 in accordance with the setting.

When the relay device 4B selects the input/output of the first band control unit 44 in response to the selector signal, the first band control unit 44 is able to delete the idle signal equivalent to 100 GBE from the 400 GBE signal, and output the 300 GBE signal after the deletion of the idle signal to the DEMUX unit 17. When the relay device 4B selects the input/output of the second band control unit 45 in response to the selector signal, the second band control unit 45 is able to extract a communication capacity for each VLAN identifier from the 400 GBE signal, and output the 300 GBE signal excluding the 100 GBE idle signal to the DEMUX unit 17.

A case in which the communication system 1 illustrated in FIG. 1 includes the first termination device 2, the OTN device 3, the relay device 4, and the second relay device 5 is exemplified above; however, the signals may not be required to pass through the OTN device 3 so that the configuration of the system may be appropriately modified, and thus an embodiment of such system configuration will be described below as a fourth embodiment.

Fourth Embodiment

Figure 8:
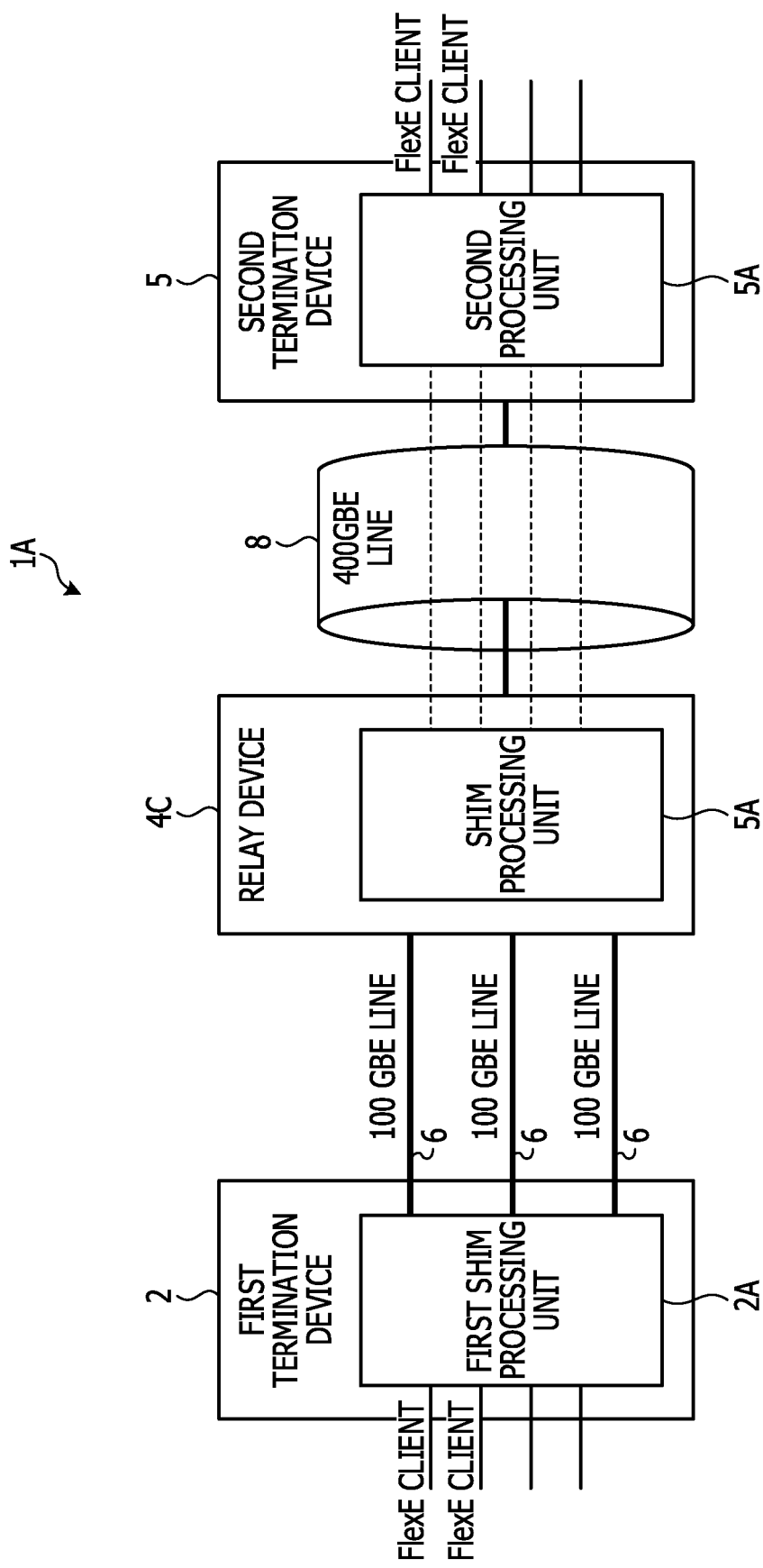
FIG. 8 is an explanatory diagram illustrating an example of a communication system of a fourth embodiment.

FIG. 8 is an explanatory diagram illustrating an example of a communication system 1A of a fourth embodiment. Note that the same constituent elements as those of the communication system 1 of the first embodiment are given the same reference numerals, and redundant descriptions of the constituent elements and operations thereof will be omitted. The communication system 1A illustrated in FIG. 8 includes a first termination device 2, a relay device 4C, and a second termination device 5. The first termination device 2 and the relay device 4C are connected to each other with three 100 GBE lines 6. The relay device 4C and the second termination device 5 are connected to each other with a single 400 GBE line 8.

The relay device 4C includes neither a first conversion unit 12 nor a second conversion unit 18, and causes a first reception unit 11 and a MUX unit 13 to be directly connected to each other. The MUX unit 13 inputs three 100 GBE signals received by the first reception units 11, to the MUX unit 13. The relay device 4C causes a DEMUX unit 17 and a second reception unit 16 to be directly connected to each other. The DEMUX unit 17 demultiplexes a 300 GBE signal from a band control unit 32 into 100 GBE signals, and outputs the 100 GBE signals to second transmission units 19.

When the relay device 4C receives a 300 GBE signal from the three 100 GBE lines 6, the relay device 4C extracts a communication capacity (300 GBE) of the transmission source from FlexE Shim information in the 300 GBE signal. The relay device 4C generates an idle signal equivalent to 100 GBE in accordance with a difference amount between the communication capacity of the 400 GBE line 8 and the communication capacity of the three 100 GBE lines 6. Further, the relay device 4C generates one 400 GBE signal in which an idle signal equivalent to 100 GBE is added to a user signal equivalent to 300 GBE in the 300 GBE signal. Furthermore, the relay device 4 outputs the above one 400 GBE signal to the 400 GBE line 8. Consequently, the relay device 4C makes it possible to establish a FlexE signal relay between the three 100 GBE lines 6 and the single 400 GBE line 8 even when the line configurations are different between the three 100 GBE lines 6 and the 400 GBE line 8.

The constituent elements of the respective units illustrated may not be required to be physically configured as illustrated in the drawings. For example, a specific form of distribution and integration of each unit is not limited to the form illustrated in the drawings, and all or part thereof may be configured by being distributed or integrated functionally or physically in any units depending on various loads, usage situations, and the like.

All of or an arbitrary part of the various processing functions executed by each device may be executed on a central processing unit (CPU) (or microcomputer such as micro processing unit (MPU) or micro controller unit (MCU)). It goes without saying that all or an arbitrary part of the various processing functions may be executed on a program analyzed and executed by the CPU (or microcomputer such as MPU or MCU), or may be executed on wired-logic hardware.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication apparatus comprising:
   a receiver configured to receive a signal from a first line;
   a signal processing circuit configured to perform descrambling processing on the received signal, detect a control signal from the descrambled signal, generate a signal in which an idle signal in accordance with a difference amount between a communication capacity of a second line as a transmission destination and a communication capacity of the first line is inserted in a position where the control signal is detected, and perform scrambling processing on the generated signal; and
   a transmitter configured to output the scrambled signal to the second line.

2. The communication apparatus according to claim 1, wherein
   the signal processing circuit replaces the idle signal with a control signal in which the communication capacity of the first line is inserted, and generates the signal by adding the control signal in which the communication capacity of the first line is inserted to a user signal.

3. The communication apparatus according to claim 1, further comprising:
an opposing-side transmitter configured to delete, when a signal is received from the second line, the idle signal from the signal received from the second line based on the communication capacity of the first line, and output the signal after the deletion of the idle signal as a signal of the first line.

4. The communication apparatus according to claim 1, wherein
the signal processing circuit replaces the idle signal with a control signal in which a transmission stop command is inserted when an amount of buffer accumulation in a band control unit exceeds a set amount, and generates the signal by adding the control signal in which the transmission stop command is inserted to the user signal.

5. The communication apparatus according to claim 2, wherein
the signal processing circuit detects a situation in which a control bit in a first signal continues equal to or over a set interval, and generates the signal in which inserted is the control signal in which the communication capacity of the first line or the transmission stop command is inserted in a position of the control bit.

6. The communication apparatus according to claim 2, wherein
the signal processing circuit extracts a communication capacity for each user identifier from a signal of the first line, and inserts the communication capacity for each user identifier as a communication capacity of the first line in the idle signal.

7. A signal relay method for a communication apparatus, the method comprising:
receiving a signal from a first line;
performing descrambling processing on the received signal;
detecting a control signal from the descrambled signal;
generating a signal in which an idle signal in accordance with a difference amount between a communication capacity of a second line as a transmission destination and a communication capacity of the first line is inserted in a position where the control signal is detected;
performing scrambling processing on the generated signal; and
outputting the scrambled signal to the second line.

8. The signal relay method for a communication apparatus according to claim 7, wherein
the generating of the signal includes replacing the idle signal with a control signal in which the communication capacity of the first line is inserted, and generating the signal by adding the control signal in which the communication capacity of the first line is inserted to a user signal.

* * * * *